US010785182B2

(12) United States Patent
Gupta et al.

(10) Patent No.: US 10,785,182 B2
(45) Date of Patent: Sep. 22, 2020

(54) AUTOMATIC ANNOTATION OF SOCIAL MEDIA COMMUNICATIONS FOR NOISE CANCELLATION

(71) Applicant: Freshworks, Inc., San Bruno, CA (US)

(72) Inventors: Anuj Gupta, Chennai (IN); Saurabh Arora, Chennai (IN); Satyam Saxena, Chennai (IN); Navaneethan Santhanam, Chennai (IN)

(73) Assignee: Freshworks, Inc., San Bruno, CA (US)

( * ) Notice: Subject to any disclaimer, the term of this patent is extended or adjusted under 35 U.S.C. 154(b) by 44 days.

(21) Appl. No.: 15/920,723

(22) Filed: Mar. 14, 2018

(65) Prior Publication Data

US 2019/0207902 A1    Jul. 4, 2019

(30) Foreign Application Priority Data

Jan. 2, 2018 (IN) .............................. 201841000124

(51) Int. Cl.
| | | |
|---|---|---|
| H04L 12/58 | (2006.01) | |
| G06N 20/00 | (2019.01) | |
| G06F 16/955 | (2019.01) | |

(52) U.S. Cl.
CPC ............ H04L 51/32 (2013.01); G06F 16/955 (2019.01); G06N 20/00 (2019.01); H04L 51/16 (2013.01); H04L 51/02 (2013.01); H04L 51/08 (2013.01)

(58) Field of Classification Search
CPC ...................................................... H04L 51/32
USPC ...................................................... 709/206
See application file for complete search history.

(56) References Cited

U.S. PATENT DOCUMENTS

| | | | |
|---|---|---|---|
| 6,604,210 B1 * | 8/2003 | Alexander, III .... G06F 11/3636 | 714/39 |
| 7,539,934 B2 | 5/2009 | Kender et al. | |
| 7,861,154 B2 | 12/2010 | MacLaurin | |
| 8,108,413 B2 | 1/2012 | Kar et al. | |
| 8,296,320 B1 * | 10/2012 | Corbett ................... H04L 63/10 | 707/781 |
| 8,996,983 B2 | 3/2015 | Snijder | |
| 9,432,325 B2 * | 8/2016 | Skiba .................. H04M 3/5175 | |
| 10,003,560 B1 * | 6/2018 | Perkins ................... H04L 51/32 | |
| 2003/0154212 A1 * | 8/2003 | Schirmer ............. G06Q 10/107 | |
| 2003/0177190 A1 * | 9/2003 | Moody ................... H04L 51/00 | 709/206 |
| 2005/0027664 A1 | 2/2005 | Johnson et al. | |

(Continued)

OTHER PUBLICATIONS

Merriam-Webster, "compile", 2019 (Year: 2019).*

(Continued)

*Primary Examiner* — Ondrej C Vostal
(74) *Attorney, Agent, or Firm* — LeonardPatel PC; Michael Aristo Leonard II; Sheetal Suresh Patel (57) ABSTRACT

Large batches of social media communications may be automatically annotated. This provides techniques to create large labeled datasets without the assistance of human labelers. For instance, social media communications may be fetched and annotated as actionable or noise for a given account (e.g., a brand handle on Twitter®) without human review. Social media communications from users who are attempting to engage with a brand or entity on a social media platform may be annotated as actionable, whereas other communications may be labeled as noise.

19 Claims, 6 Drawing Sheets

(56) References Cited

U.S. PATENT DOCUMENTS

| | | | |
|---|---|---|---|
| 2005/0080860 A1* | 4/2005 | Daniell | G06Q 10/107 709/206 |
| 2005/0143008 A1* | 6/2005 | Bailey | H04B 1/10 455/63.1 |
| 2006/0282438 A1* | 12/2006 | Zhou | G06F 16/9027 |
| 2008/0192302 A1* | 8/2008 | Rohall | G06Q 10/107 358/402 |
| 2012/0269303 A1* | 10/2012 | Paker | H04L 25/03242 375/341 |
| 2014/0379818 A1* | 12/2014 | Cudak | H04L 51/16 709/206 |
| 2015/0019664 A1* | 1/2015 | Lu | H04L 51/12 709/206 |
| 2015/0156146 A1* | 6/2015 | Miners | H04L 51/046 709/206 |
| 2015/0287093 A1* | 10/2015 | Steele | G06Q 30/0269 705/80 |
| 2015/0326519 A1* | 11/2015 | Bhide | H04L 51/22 709/206 |
| 2016/0087928 A1* | 3/2016 | Soldner | H04L 51/10 709/206 |
| 2016/0117144 A1* | 4/2016 | Soldner | G06F 3/165 700/94 |
| 2016/0162582 A1* | 6/2016 | Chatterjee | G06F 16/9535 707/706 |
| 2016/0191453 A1* | 6/2016 | Thomas | H04W 4/12 709/206 |
| 2016/0224373 A1* | 8/2016 | Harris | G06F 9/5027 |
| 2017/0031932 A1* | 2/2017 | Berrington | G06F 16/13 |
| 2018/0025360 A1* | 1/2018 | Gorny | G06Q 30/01 707/748 |

OTHER PUBLICATIONS

Treiber et al., "Tweetflow—Flexible Workflows with Twitter", 2011 (Year: 2011).*

Microsoft Computer Dictionary, "thread", 5th edition, 2002 (Year: 2002).*

Scikit Support Vector Machines Article, http://scikit-learn.org/stable/modules/svm.html#svm-outlier-detection (last accessed Mar. 14, 2018).

Twitter Enterprise API Platform Page, https://developer.twitter.com/en/enterprise (last accessed Mar. 14, 2018).

* cited by examiner

RELATED ART

FIG. 6

AUTOMATIC ANNOTATION OF SOCIAL MEDIA COMMUNICATIONS FOR NOISE CANCELLATION

CROSS REFERENCE TO RELATED APPLICATION

This application claims the benefit of Indian Patent Application No. 201841000124 filed Jan. 2, 2018. The subject matter of this earlier-filed application is hereby incorporated by reference in its entirety.

FIELD

The present invention generally relates to annotation of datasets, and more specifically, to automatic annotation of social media communications for noise cancellation.

BACKGROUND

Social media communication systems, such a Twitter®, Pinterest®, Facebook®, Instagram®, LinkedIn®, Google+®, Google Play® Store, YouTube®, blogs, forums, and the like, are increasingly used by various organizations, such as companies, governmental entities, nonprofit organizations, individuals with a social media following, etc., to connect with their customers or other interested individuals (e.g., individuals interested in a product, following a celebrity, etc.). For instance, users may send relatively short messages to organizations offering comments, offering feedback, requesting assistance, etc. that are monitored by company personnel. This provides interested individuals with an alternative mechanism to communicate with organizations, as opposed to using email, submitting a web form, chat, seeking in-application support, or calling a customer service representative at a call center via telephone.

However, such social media communications consist of a uniquely high percentage of "noise" and a relatively small percentage of "actionable" communications. As defined herein, "noise" refers to communications where individuals have no intent of engaging with the entity, brand, or individual. "Noise" is also often referred to as spam. Conversely, "actionable" communications are those where an individual does intend to engage with the entity, brand, or individual. For some organizations, noise can make up 90-95% of the inbound communications that they receive through social media. This hinders the organization's ability to respond quickly to genuine issues its consumers or other interested individuals are experiencing.

Machine learning models could be applied in an attempt to identify actionable/noise communications and segregate them from one another. However, in order to train machine learning models for this task, datasets of social media communications would be needed where each communication is labeled with its true class—noise or actionable. There is no known publicly available dataset to build/train a machine learning tool to identify noise from social media communications.

In general, in order to label a dataset, either a team of human annotators may be employed or services like Amazon Turk® can be used to register and upload machine-readable tasks for human annotators. However, some social media communications are confusing enough that even the human annotator is not confident of the classification. Such communications may then be reviewed by a group of 3-5 people, and labeled noise or actionable (often by a majority vote, but more complex strategies such as weighted voting may be used). This process of manually assigning a label to every communication in the dataset is often time consuming and expensive.

The time and cost incurred using human annotators may be acceptable for small datasets. However, for creating large datasets, such a human-driven process would require a large and impractical amount of time and cost. Indeed, for annotating a large dataset, there is currently no viable approach to label social media communication data, and the cost of producing a large-scale human-generated labeled dataset would far outweigh the return on investment. Due to the amount of labeled data necessary to train a machine learning system effectively, the process is simply not feasible with human reviewers.

Accordingly, an improved, automated system to annotate social media communications may be beneficial.

SUMMARY

Certain embodiments of the present invention may provide solutions to the problems and needs in the art that have not yet been fully identified, appreciated, or solved by conventional social media communication annotation approaches. For example, some embodiments pertain to automatically annotating large datasets of social media communications.

In an embodiment, a computer program is embodied on a non-transitory computer-readable medium. The program is configured to cause at least one processor to fetch outgoing social media communications from one or more social media assets. A social media asset for a brand or an individual is an account associated with one or more social media communication systems. The program is also configured to cause the at least one processor to fetch social media communications that mention or tag the one or more social media assets and automatically compile a collection of actionable social media communications from the fetched social media communications for the one or more social media assets. The program is further configured to cause the at least one processor to automatically compile a collection of noise social media communications from the fetched social media communications that mention or tag the one or more social media assets.

In another embodiment, a computer-implemented method includes fetching, by a computing system, outgoing social media communications for one or more social media assets. A social media asset for a brand or an individual is an account associated with one or more social media communication systems. For each fetched social media communication for the one or more social media assets, the computer-implemented method also includes, when a current social media communication is a reply to any inbound message, traversing up a tree for a current social media communication thread to its root social media communication, by the computing system, determining, by the computing system, whether or not the current social media communication is actionable, when the current social media communication is actionable, adding the social media communication to a collection of actionable social media communications, by the computing system, and when the current social media communication is not actionable, dropping the social media communication, by the computing system. When the current social media communication is not a reply to any inbound message, the computer-implemented method further includes dropping the current social media communication, by the computing system.

In yet another embodiment, a computer-implemented method includes fetching, by a computing system, social media communications that tag or mention one or more social media assets. A social media asset for a brand or an individual is an account associated with one or more social media communication systems. For each fetched social media communication that tags or mentions the one or more social media assets, the computer-implemented method also includes checking whether the social media communication has any soft-engagement activity from a brand associated with the one or more social media assets, by the computing system, and when the status is not indicative of noise, dropping the social media communication, by the computing system. Otherwise, the computer-implemented method further includes checking whether the brand associated with the one or more social media assets has responded to the social media communication, by the computing system, and when the brand has not responded, dropping the social media communication, by the computing system.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to automatically annotating large datasets of social media communications (e.g., typically 2,000 to 3,000 communications or more). For instance, social media communications may be fetched and annotated as actionable or noise for a given account (e.g., a brand handle on Twitter®) without human review. Social media communications from users who are attempting to engage with a brand or entity on a social media platform may be annotated as actionable, whereas other communications may be labeled as noise.

Actionable communications may include, but are not limited to, technical support issues, inquiries about a product release date, grievances, incidents, suggestions to improve service, critiques of company policies, etc. Non-actionable communications (i.e., "noise" or spam) may include, but are not limited to, suggestions to other users, promotions, coupons, offers, marketing campaigns, affiliate marketing, statements that a user is attending an event, etc. Some examples of Twitter® tweets that may be actionable to a certain organization are included in Table 1 below.

TABLE 1

EXAMPLE ACTIONABLE TWEETS
Actionable:

@ENTITY When will you guys ship to México?
Pretty sure I'm never ordering from @ENTITY again because in 2016 they still haven't figured out how to ship to Hawaii in a timely fashion.
@ENTITY pretty bad when I walk out after 15 minutes waiting for $.76 change. How do u make millions but don't have $.76 change? Pathetic.
@ENTITY When you open a can that has a huge nail in it. Not okay.
@ENTITY1 FYI I just received what I think is a scam mail from an organization claiming to be you (sponsored by @ENTITY2 & @ENTITY3)

Some examples of Twitter® tweets that may be considered by a certain organization to be noise are included in Table 2 below.

TABLE 2

EXAMPLE NOISE TWEETS
Noise:

ENTITY Happily Ever Excellent Sweepstakes! http://link.com via @USER
Win Glass Sneakers & Vacation Trip With ENTITY Excellent Sweepstakes http://link.com #sneakers #fashion
Want to win a $500 @ENTITY gift card? Enter @USER's Fall Back and Win #sweepstakes today! http://link.com
Only two days left to vote!! Vote now for your favorite entry in the ENTITY Contest! https://link.com It should be noted that while the above examples apply to potentially actionable/non-actionable Twitter® tweets, some embodiments apply to any text-based social media communications. For instance, the following LinkedIn® communication may be considered actionable:

ENTITY needs to understand the fallacies in human interactions. Their staff suggested a product to me. Within 5 minutes of payment, I informed them that this is not what I need. But oh ohhhhhhh . . . .

Once your money is with them, it's ONLY their way, ONLY their policy. No refunds, no adjustments, no course corrections allowed. Six days of persistent follow-up from me—TaDa. They have the money now, and they will simply not listen to any request!

Will this be the future as we deal with more and more online companies? It used to be so much easier walking into stores and talking to human beings.

Bye-bye ENTITY. I am going elsewhere, and so will all those who want ETHICS in business.

Facebook® communications may also be processed. For instance, the following post may be considered actionable by many retail entities.

USER NAME I'd love to be swimming in the pool I ordered for my family off of ENTITY's website this weekend. Too bad it never made it today, because the freight company DIDN'T show up!!! (I confirmed the delivery date several days in advance) I was told that "The scheduler was supposed to call you, but he left early today." # thanksforwastingmytime # youhave-
lostacustomerforlife # ENTITYfail The following Facebook® post may be considered actionable by an auction site entity.

SELLER NAME I am extremely disappointed and upset with ENTITY. I have been a supporter and loyal customer for many years. Check my account.

I recently sold my PRODUCT NAME on ENTITY's website. The buyer had a 100% rating across 7 reviews. I shipped to Ukraine with the shipping information provided on your website. However, I never received payment for PRODUCT NAME.

While the examples herein are in English, in some embodiments, other languages or multiple languages are processed.

Determinations of whether a communication is actionable may be made without using sentiment, which may not be indicative of whether a user intends to engage with an entity or brand. For instance, the tweet "Is the product available?" is neutral in sentiment, but the consumer intends to engage with the brand. As such, this may be considered actionable by many organizations (although some may not wish for this to be actionable). However, consider the case where the consumer tweets "I love this product! The current release is the best I have seen!" While the comments are positive, the user is not actively seeking to engage with the brand. As such, no response from a customer service representative may be required, so the tweet may not be considered actionable (although some brands may wish to respond to positive sentiment in various ways).

Application Programming Interfaces (APIs) may be used in some embodiments to access large amounts of social media communications for a given account. For instance, using Twitter® as a nonlimiting example, the Gnip API may be used to extract a large number of tweets for various accounts. See https://developer.twitter.com/en/enterprise. For Facebook®, the Graph API may be used, and any suitable extraction API may be used for any respective social media communication platform without deviating from the scope of the invention. These tweets can then be processed and annotated as actionable or noise, for example. The process of some embodiments has two phases: fetching actionable social media communications and fetching noise social media communications. This process may be implemented in some embodiments using system 100 of FIG. 1.

Figure 1:
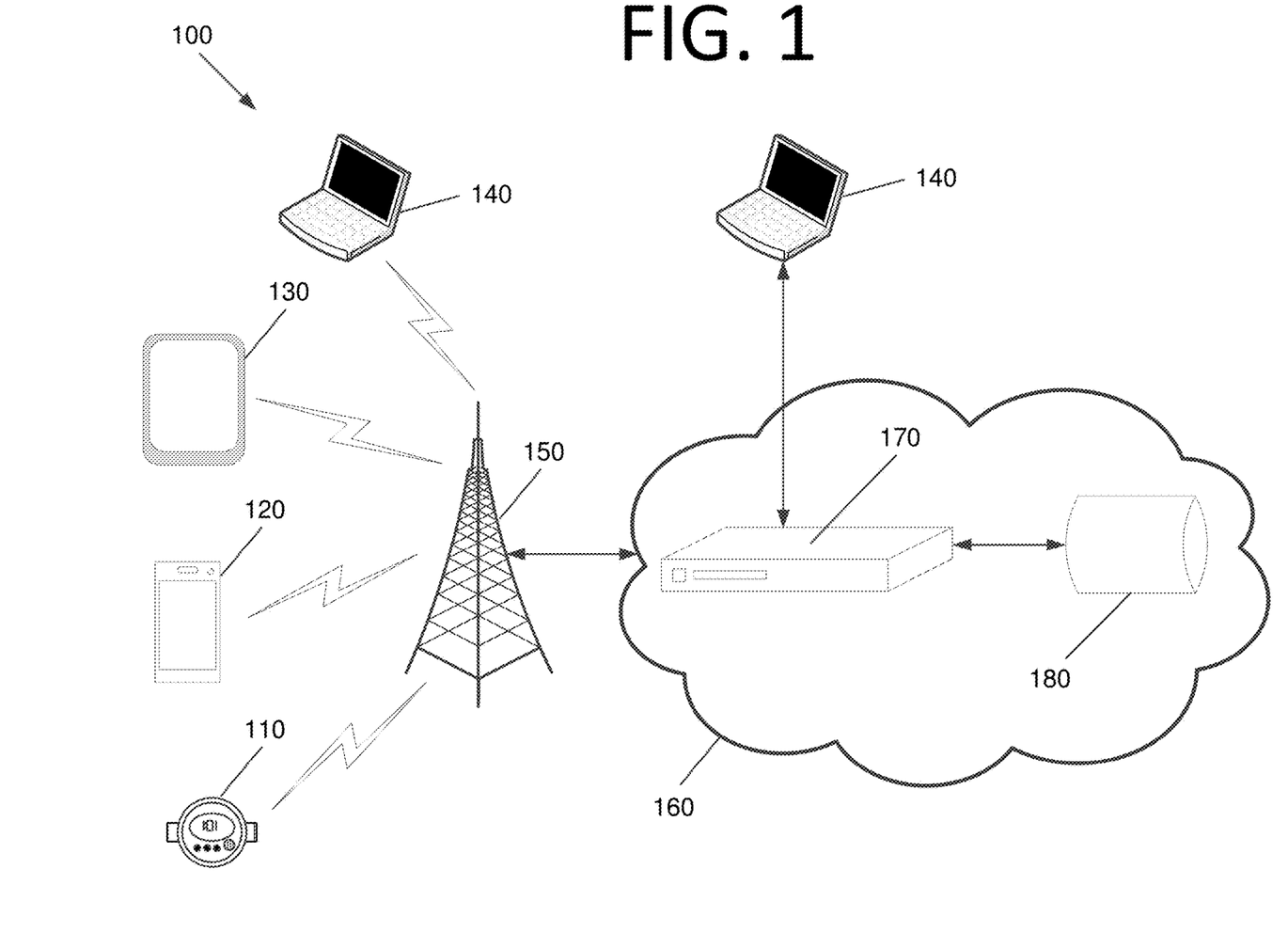
FIG. 1 is an architectural diagram illustrating a system configured to perform automatic annotation of social media communications, according to an embodiment of the present invention.

FIG. 1 is an architectural diagram illustrating a system 100 configured to perform automatic annotation of social media communications, according to an embodiment of the present invention. System 100 includes a smart watch 110, a mobile phone 120, a tablet computer 130, a laptop computer 140, a base station 150, the Internet 160, a server 170, a database 180, and a customer service computer 190. While the communications here are shown as wireless for smart watch 110, mobile phone 120, tablet computer 130, and laptop computer 140, in some embodiments, wired communications may also be used for one or more of the communication links. Also, Ethernet, Wi-Fi, Bluetooth™, cable, any other suitable communications technology, or any combination thereof, may be used without deviating from the scope of the invention. Indeed, any local area network (LAN), wide area network (WAN), or Internet technology may be used supplemental to, or in place of, the network depicted herein.

Users of smart watch 110, mobile phone 120, tablet computer 130, and laptop computer 140 (e.g., social media users that are interested individuals with respect to an entity or brand) use a social media application running thereon.

The social media application may be custom-tailored for the specific hardware capabilities, display constraints, etc. of each device. In FIG. 1, smart watch 110, mobile phone 120, tablet computer 130, and laptop computer 140 communicate with the Internet 160 via base station 150. Base station 150 communicates with the Internet 160 via a telecommunications network, which may be any suitable telecommunications network, such as those of any currently available commercial carrier or combination of carriers. The telecommunications network may utilize any suitable standards and technologies, such as enhanced Node Bs, Radio Network Controllers (RNCs), 3G, 4G, 5G, etc. For the sake of convenience, the details of the telecommunications network are not shown, and the details of the Internet 160 are abstracted here, but may have any desired architecture without deviating from the scope of the invention.

Within or otherwise accessible by the Internet 160 is a server 170 that runs a machine learning application for automatic annotation of social media communications. For instance, application may use machine learning to annotate social media communications as noise or actionable for a given social media account or handle. The application may store/update various information with respect to the social media communications in a database 180. Annotated data may then be accessed by a user, such as a customer service representative, via computer 190.

Fetching Actionable Social Media Communications

In an implemented embodiment, a list of Twitter® handles was prepared manually. The handles in the list primarily included customer support handles of various brands. For each of the handle in the list, steps listed in FIG. 2 were followed.

Figure 2:
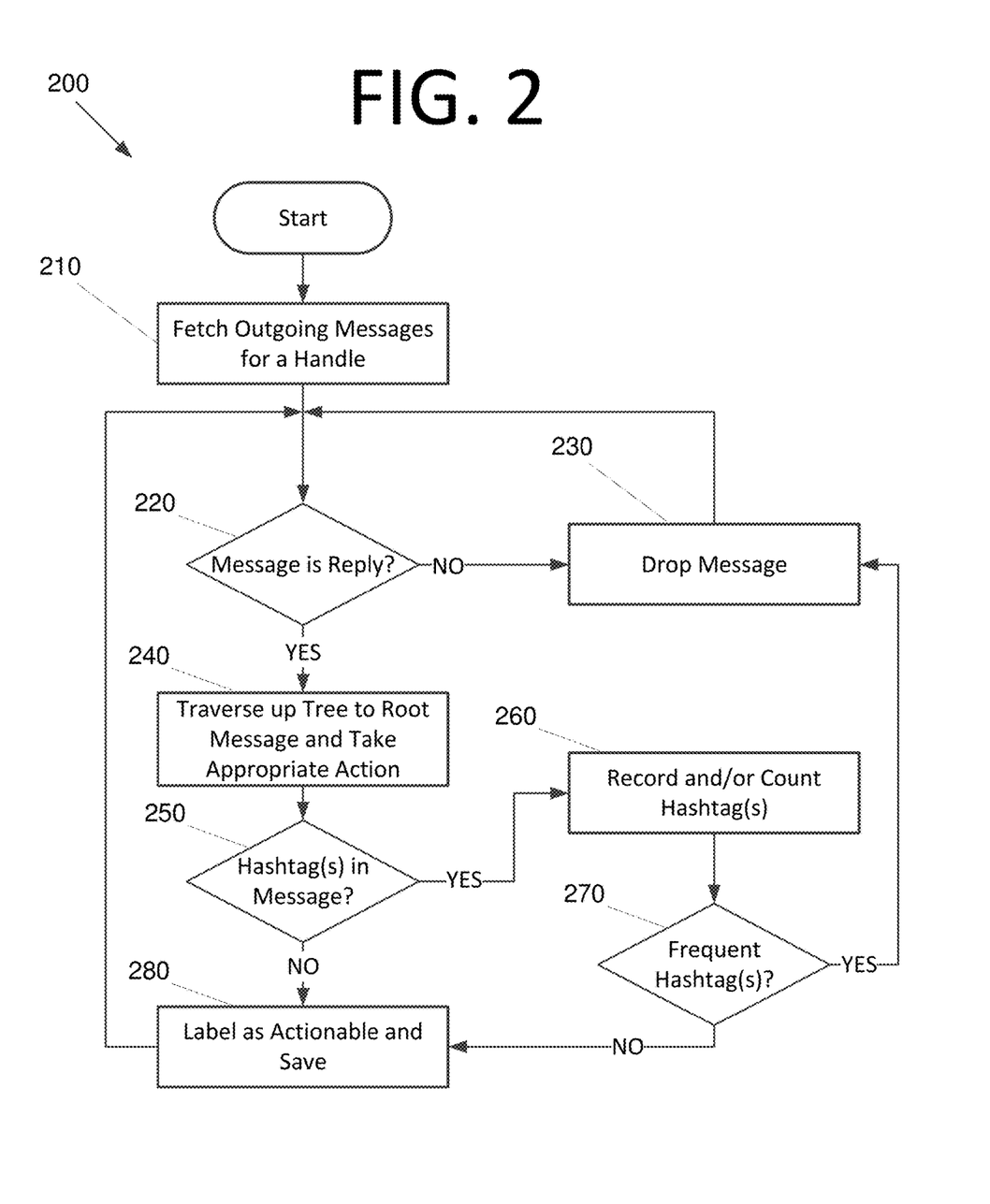
FIG. 2 is a flowchart illustrating a process for fetching actionable social media communications for a Twitter® account, according to an embodiment of the present invention.

FIG. 2 is a flowchart illustrating a process 200 for fetching actionable social media communications for a Twitter® account, according to an embodiment of the present invention. However, it should be noted that a similar fetching process with platform-relevant changes may be used for any social media communication platform without deviating from the scope of the invention. The social media communications may be fetched, and the process of FIG. 2 performed, for one or more "social media assets." A social media asset for a brand or an individual is an account associated with one or more social media communication systems. In the case of Twitter®, social media assets are handles. The process as shown in FIG. 2 begins with fetching outgoing messages (i.e., social media communications) for a handle at 210. For instance, Twitter® tweets may be fetched for handles such as @Walmart, @iPhone, @JustinBieber, etc. In some embodiments, only the N most recent messages are fetched, where N is an integer (e.g., N=3,200 or any other number without deviating from the scope of the invention).

In Gnip, for instance, fetching is done in batches. Once the current batch of messages for the handle have been fetched, the system may perform steps 220-280 for each message (naturally stopping for a given message if the message is dropped). For each message, the system checks whether or not the current message is a reply to another tweet at 220. In the case of Twitter®, for instance, this may be determined by checking whether the "in_reply_to_status_id" field of the message is null. If the message is not a reply, the message is dropped from the collection at 230.

However, if the message is a reply at 220, the system traverses up the communication tree (i.e., thread) to the root message, checks whether the ID of the root message has previously been saved, and if not, takes an appropriate action at 240. More specifically, taking an appropriate action involves saving the root message to a collection of "tentatively actionable" messages if it has not been previously saved, and otherwise ignoring the root message. Alternatively, a list of processed root IDs may be stored, regardless of whether they were saved or subsequently discarded. To traverse up the tree to the root message, the system may fetch the message that the current message's in_reply_to_status_id points to, and repeat this process until the current message's in_reply_to_status_id is null. In some embodiments, the system may only traverse a predetermined number of levels up the tree (e.g., 5 or any other desired number without deviating from the scope of the invention) in order to reduce processing time.

Once the root message is found, the root message is added to the collection of "tentatively actionable" messages. However, this collection requires some further processing to determine whether each message therein is indeed actionable or not. Sometimes brands run campaigns on their social media accounts. For instance, a brand may be running a campaign where individuals include a hash tag in their communications and the brand responds to such communications. Technically, such messages from users are not customer support messages since the user does not intend to engage with the brand, yet the brand still responds to the user's message to increase/promote activity in the campaign. To account for this, the system checks whether one or more hashtags are included in the message at 250. If so, the hashtag(s) are stored if it has not been stored before and a count for each hashtag is incremented at 260. If the message includes one or more frequently included hashtags that appear at least a predetermined number of times in communications from the brand at 270, the hashtag(s) are likely a part of a campaign, and the message is dropped at 230. In some embodiments a different predetermined number may be used for at least two hashtags. In certain embodiments, each hashtag may have a different threshold.

However, if this is not the case, the message is labeled as actionable and saved at 280. The end result of this process is a collection of actionable messages that came from users to the brand. In some embodiments, this process may be repeated for multiple handles, or messages for multiple handles may be fetched and processed in the same batch.

Fetching Noise Social Media Communications

In the implemented embodiment discussed below with respect to FIG. 3, the list of handles discussed above with respect to FIG. 2 was also used. For each handle in this list, the steps listed in FIG. 3 were followed. As with FIG. 2, it should be noted that a similar process to that of FIG. 3 with platform-relevant changes may be used for any social media communication platform without deviating from the scope of the invention. For instance, the process of FIG. 3 may be performed for one or more social media assets.

Figure 3:
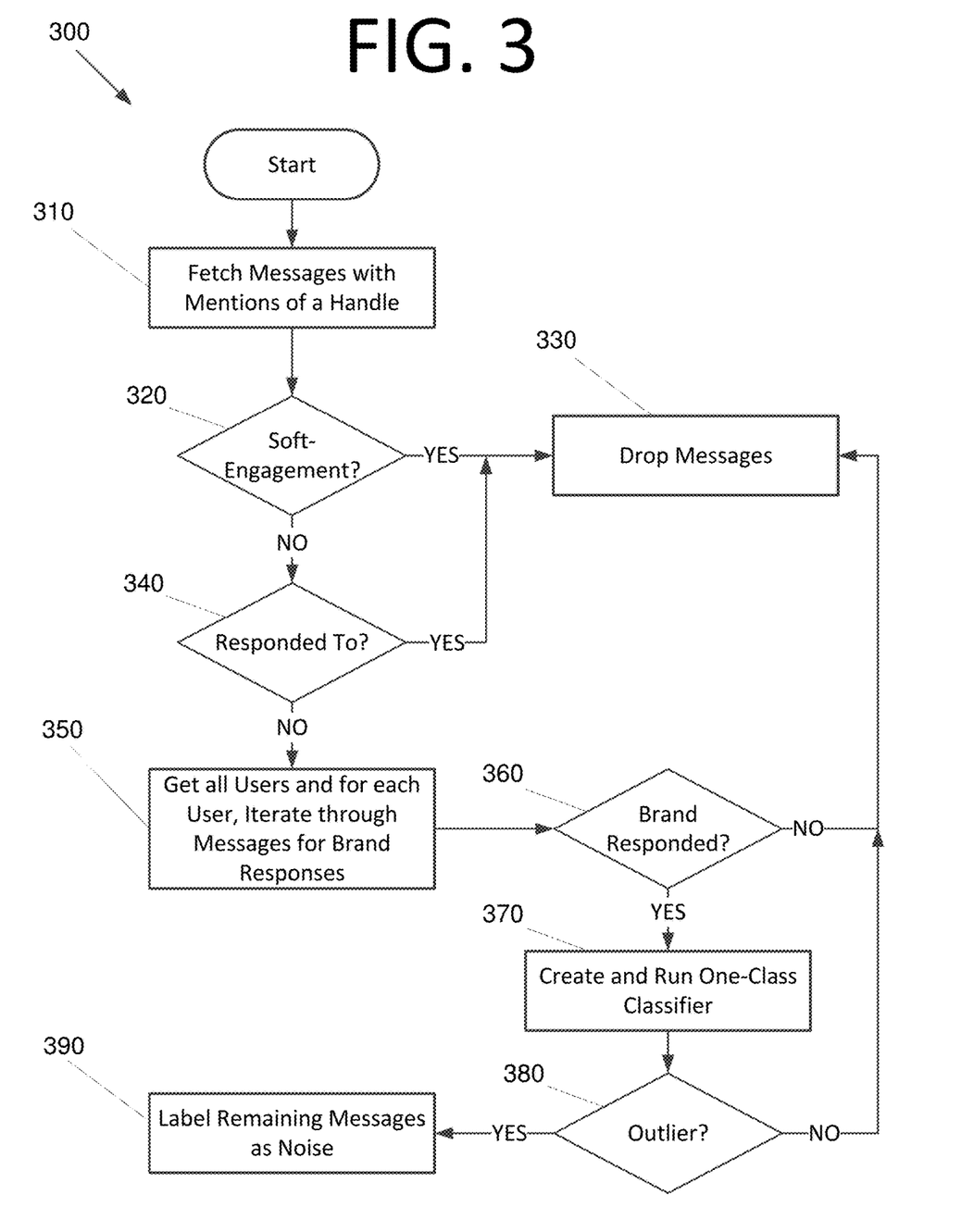
FIG. 3 is a flowchart illustrating a process for fetching noise social media communications for a Twitter® account, according to an embodiment of the present invention.

FIG. 3 is a flowchart illustrating a process 300 for fetching noise social media communications for a Twitter® account, according to an embodiment of the present invention. The process begins with searching and fetching messages with mentions of a handle at 310. For instance, all messages mentioning the Twitter® handle @Walmart in their text may be fetched. In some embodiments, a predetermined number of the most recent messages with mentions of the handle may be fetched.

Once the messages mentioning the handle have been fetched, the system checks whether any message in the collection for the brand has had any kind of activity that indicates "soft-engagement" on it at 320. For instance, in the case of Twitter®, the system may check whether each message is marked as a favorite, retweeted, or includes a quoted tweet, which are indicators of soft-engagement. In the case of Facebook®, soft-engagement may be indicated by a like, a share, etc. If there is any activity that indicates soft-engagement, such messages are dropped at 330. Otherwise, the system checks whether the brand responded to each remaining message that has not been dropped at 340. If the brand responded, the message is not noise, the message is dropped at 330 and the process returns to step 320.

From the messages that remain, all of the users (i.e., senders) of these messages are fetched, and for each individual user in the user collection of messages that is still remaining, the system checks whether the brand has previously responded to the user at 350 in messages from its account during a previous time period (e.g., the last three weeks). This may be done by searching for messages by a given user in the actionable messages collection from the process of FIG. 2.

For users to which the brand has responded at 360, messages from all these users are retained. The remaining messages are dropped at 330. All leftover messages are tentatively noise. To remove the messages that may be genuinely actionable, but the brand has not responded to (maybe the brand just missed the message), one last filter is applied. To build this filter, the actionable messages from the process of FIG. 2 are taken and used to create a one-class classifier (OCC—also called an "outlier detector"), which is then run on the remaining messages at 370. For each message in leftover noise collection that is not predicted as an "outlier" (i.e., actionable in this case) at 380, the message is discarded at 330. However, for each message that is predicted as an "outlier" (i.e., the message noise in this case) at 380, the message is labeled as noise at 390. The end result of the process of FIG. 3 is a collection of noise messages.

In order to train the system to recognize noise with a high level of accuracy, the dataset provided to the system to recognize noise should be very crisp and clear. To achieve this, the raw data collected for noise is filtered through three different levels in some embodiments. The first level of filtration that is applied on the raw data removes all user messages to which the brand has responded.

The second level of filtration that is then applied ensures that, at this second level, there should ideally not be any user message to which the brand has responded. However, even after the first filter, there may be a scenario where messages from spammers (the brands do not respond to these user messages) are included as a part of the data collected for noise. The second filter helps remove these spammer messages by cross-checking whether the brand had responded to a user on any occasion before and if, at a later point, the brand has not responded to any message from the user. If there is no response from the brand to the user's messages, it is assumed that the brand has made a conscious decision to not respond to any more messages from the user. Such user's messages are considered "spam" and dropped from the data collected for noise.

A third and filter may then be applied. More specifically, an OCC that is trained to recognize actionable items is used on the data collected from the second filter. If the OCC recognizes that any message in this data as actionable, that message is dropped from the training dataset for noise.

The rationale behind the third filter is eliminating noisy communication from users who have responses in the actionable collection. Consider a user A who is a troll/abuser. The brand has blacklisted him, and thus, the brand never replies to him. Now say user A tweets out a genuine complaint C—but the brand does not reply to complaint C since A is blacklisted. From data labeling point of view, C will appear in the collection when searching for inbound tweets to the brand. Because brand has not responded to message C, it would likely be labeled as "noise" by the system without further processing. However, the OCC in the third filter solves this issue.

Figure 4:
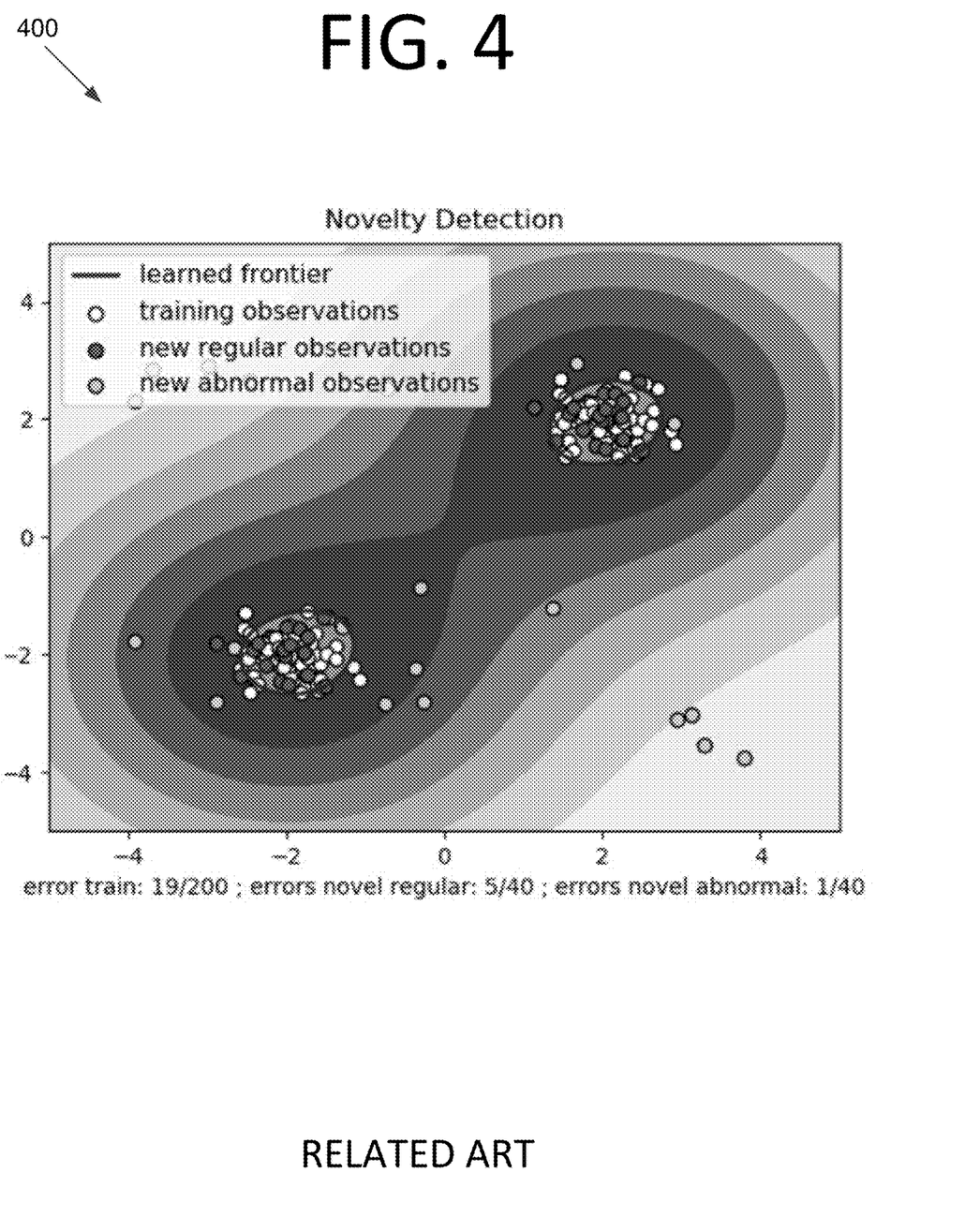
FIG. 4 is a diagram illustrating outlier/novelty detection using a one-class classifier (OCC).

The trained OCC model built on the actionable messages is employed on pre-final noise messages to further improve noise label quality by detecting outliers. Any suitable OCC may be used, such as the scikit one-class support vector machine (SVM). See http://scikit-learn.org/stable/modules/svm.html # sym-outlier-detection. OCCs are used in some embodiments for novelty detection. In other words, given a set of samples, OCCs will detect the soft boundary of a set and classify new points as belonging to that set or not. A graph illustrating such an outlier/novelty detection approach 400 is shown in FIG. 4.

The OCC is used to decide whether a new observation belongs to the same distribution as existing observations (i.e., it is an inlier), or should be considered as different (i.e., it is an outlier). As such, OCC classifiers may perform both novelty detection and outlier detection. For novelty detection, the training data is not polluted by outliers, and detection of anomalies in new observations may be performed. For outlier detection, the training data contains outliers, and the central mode of the training data is fit, ignoring deviant observations.

The scikit one-class SVM provides a set of machine learning tools that can be used for novelty detection, outlier detection, or both. This strategy is implemented with objects learning in an unsupervised way from the data. New observations can then be sorted as inliers or outliers with a predict method. Inliers are labeled 1, while outliers are labeled −1. In this case, as it is a type of unsupervised learning, the fit method will only take as input an array X, as there are no class labels.

Figure 5:
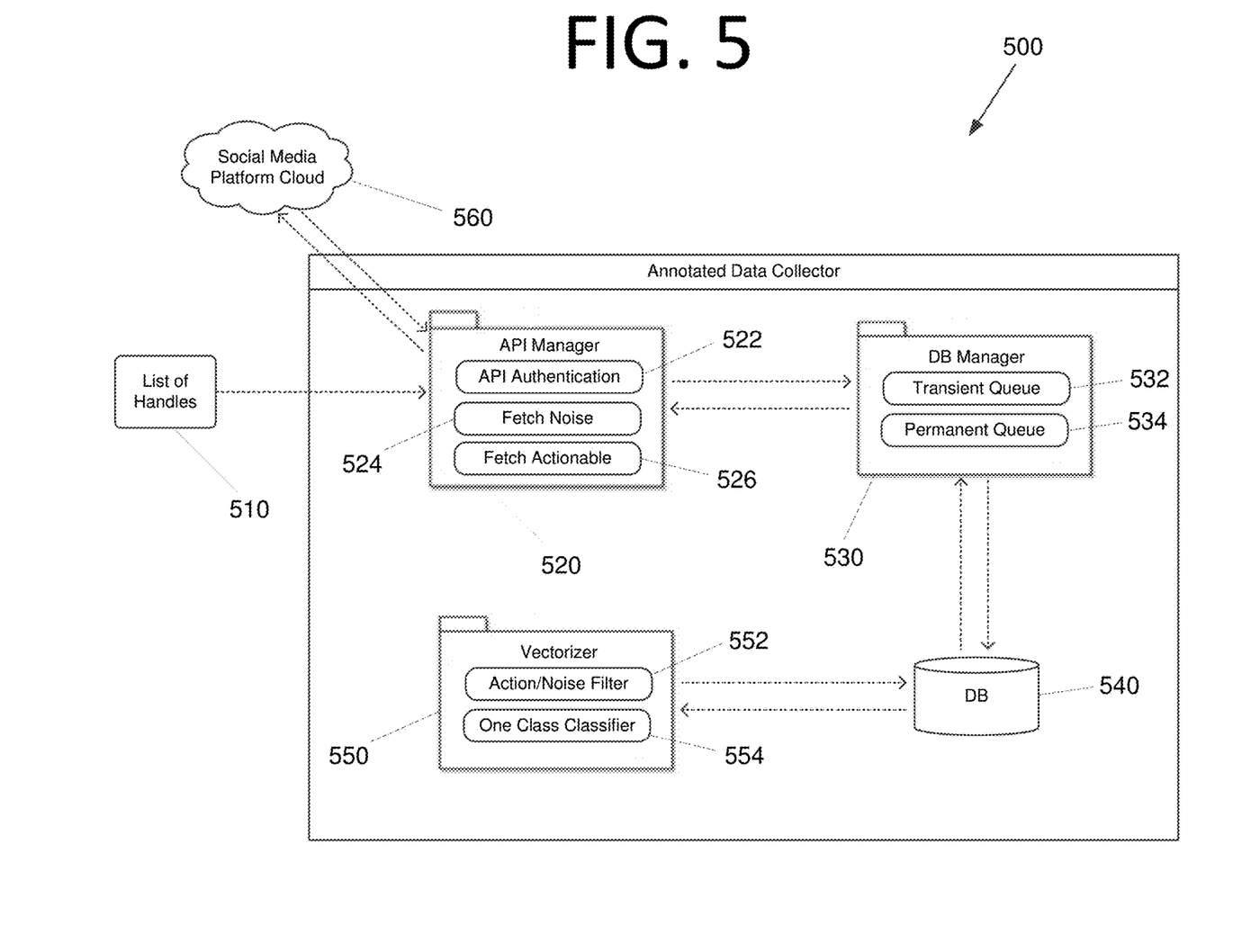
FIG. 5 is an architectural diagram illustrating an annotated data collection application, according to an embodiment of the present invention.

FIG. 5 is an architectural diagram illustrating an annotated data collection application 500, according to an embodiment of the present invention. An API manger 520 takes a list of handles 510 as input. API manager 520 uses the Gnip API in this embodiment to fetch tweets for each handle in list of handles 510. To achieve this, API manager 520 authenticates using Gnip authentication 522. However, it should be note that any suitable API and authentication mechanism may be used for any desired social media platform without deviating from the scope of the invention.

The fetched tweets are then stored in a database (DB) 540 via DB manager 530. Given the large volume of data, the fetching and processing is done with the help of a transient queue 532 and a permanent queue 534. Transient queues are used to store and process temporary data—the outgoing communication that is fetched is stored in temporary queues. Each communication in transient queue 532 is then processed to capture the complete reply thread and find the root tweet (also being referred as the original customer query). Once root communication is extracted it is moved to permanent queue 534 for further processing.

As a precursor to run a OCC on noise data, the text of each tweet should be converted into a mathematical form. Vectorizer 550 performs this task. First, an action/noise filter 552 filters out actionable data, which is vectorized. OCC 554 is trained on this data. Trained OCC 554 is then run on vectorized noise data. A job manager (not shown) may speed up the process by parallelizing the vectorized noise data. Labeled actionable and noise tweet collections are then stored in DB 540.

Figure 6:
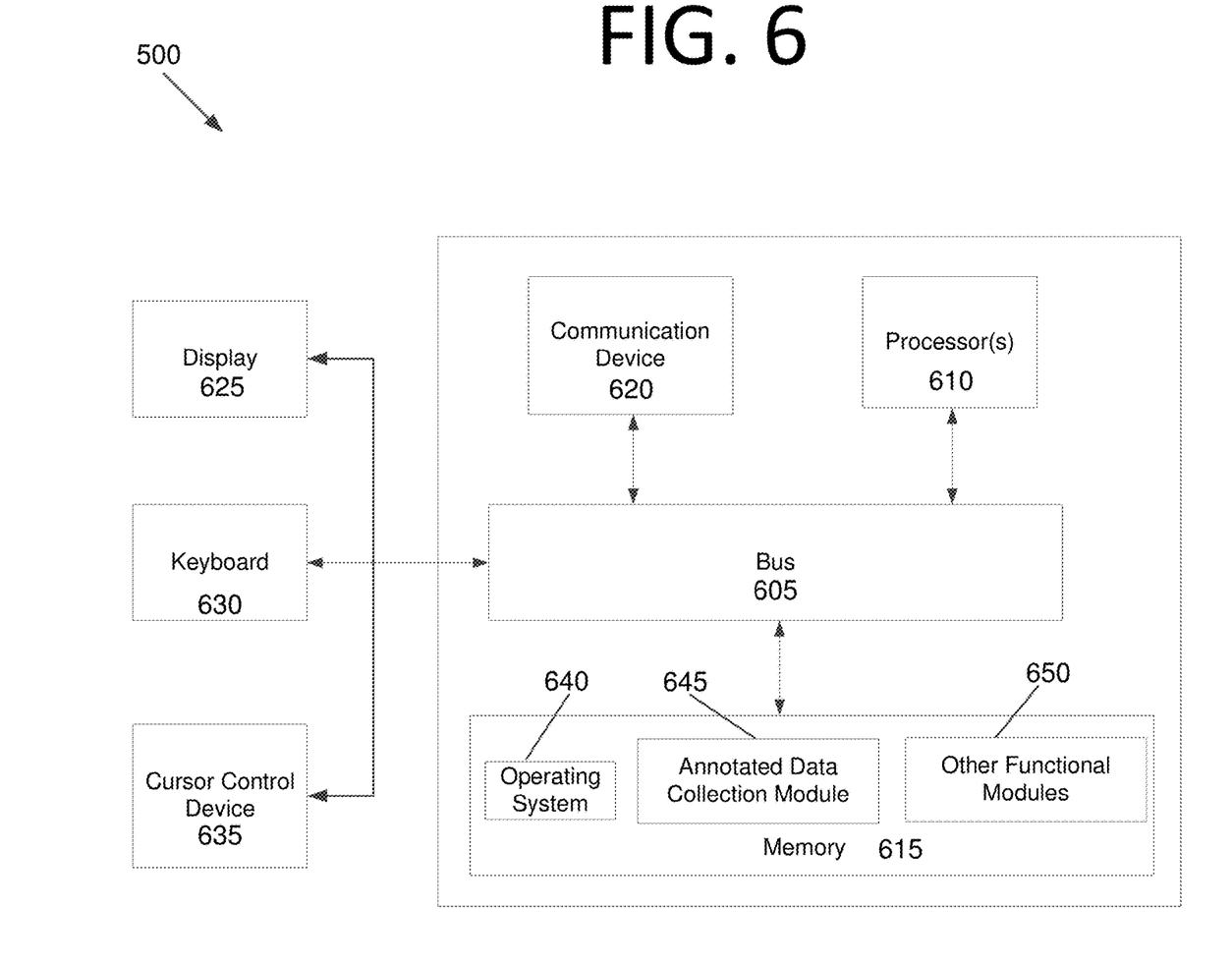
FIG. 6 is a block diagram illustrating a computing system configured to perform annotated data collection, according to an embodiment of the present invention.

FIG. 6 is a block diagram illustrating a computing system 600 configured to perform annotated data collection, according to an embodiment of the present invention. Computing system 600 includes a bus 605 or other communication mechanism for communicating information, and processor(s) 610 coupled to bus 605 for processing information. Processor(s) 610 may be any type of general or specific purpose processor, including a central processing unit (CPU) or application specific integrated circuit (ASIC). Processor(s) 610 may also have multiple processing cores, and at least some of the cores may be configured to perform specific functions. Computing system 600 further includes a memory 615 for storing information and instructions to be executed by processor(s) 610. Memory 615 can be comprised of any combination of RAM, read only memory (ROM), flash memory, cache, static storage such as a magnetic or optical disk, or any other types of non-transitory computer-readable media or combinations thereof. Additionally, computing system 600 includes a communication device 620, such as a transceiver and antenna, to wirelessly provide access to a communications network.

Non-transitory computer-readable media may be any available media that can be accessed by processor(s) 610 and may include both volatile and non-volatile media, removable and non-removable media, and communication media. Communication media may include computer-readable instructions, data structures, or program modules.

Processor(s) 610 are further coupled via bus 605 to a display 625, such as a liquid crystal display (LCD), for displaying information to a user. A keyboard 630 and a cursor control device 635, such as a computer mouse, are further coupled to bus 605 to enable a user to interface with computing system. However, in certain embodiments such as those for mobile computing implementations, a physical keyboard and mouse may not be present, and the user may interact with the device solely through display 625 and/or a touchpad (not shown). Any type and combination of input devices may be used as a matter of design choice.

Memory 615 stores software modules that provide functionality when executed by processor(s) 610. The modules include an operating system 640 for computing system 600. The modules further include an annotated data collection module 645 that is configured to perform data annotation and collection functionality in accordance with the embodiments discussed herein. Computing system 600 may include one or more additional functional modules 650 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 2 and 3 may be performed by a computer program, encoding instructions for the nonlinear adaptive processor to perform at least the processes described in FIGS. 2 and 3, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. The computer program may include encoded instructions for controlling the nonlinear adaptive processor to implement the processes described in FIGS. 2 and 3, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A non-transitory computer-readable medium storing a computer program, the program configured to cause at least one processor to:
   fetch outgoing social media communications from one or more social media assets, wherein a social media asset for a brand or an individual is an account associated with one or more social media communication systems;
   fetch social media communications that mention or tag the one or more social media assets;
   automatically compile a collection of actionable social media communications from the fetched social media communications for the one or more social media assets; and
   automatically compile a collection of noise social media communications from the fetched social media communications that mention or tag the one or more social media assets, wherein
   actionable social media communications are communications indicative that an individual intends to engage with an entity, brand, or individual; and
   noise social media communications are communications indicative that an individual has no intent of engaging with the entity, brand, or individual, wherein
   for each fetched social media communication for the one or more social media assets, when a current social media communication is a reply to any inbound message, the program is further configured to cause the at least one processor to:
  traverse up a tree for a current social media communication thread to a root social media communication of the tree, the traversing up the tree for the current social media communication comprising, when the current social media communication is a reply to another social media communication, fetching a social media communication that the current reply points to and repeating this process until the root social media communication is fetched.

2. The non-transitory computer-readable medium of claim 1, wherein for each fetched social media communication for the one or more social media assets, the program is further configured to cause the at least one processor to:
  when the current social media communication is a reply to any inbound message:
    determine whether or not the current social media communication is actionable;
    when the current social media communication is actionable, add the social media communication to the collection of actionable social media communications; and
    when the current social media communication is not actionable, drop the social media communication.

3. The non-transitory computer-readable medium of claim 2, wherein when the current social media communication is not a reply to any inbound message, the computer program is further configured to cause the at least one processor to drop the current social media communication.

4. The non-transitory computer-readable medium of claim 2, wherein only N most recent social media communications are fetched.

5. The non-transitory computer-readable medium of claim 2, wherein the program is further configured to cause the at least one processor to:
  check whether an ID of the root social media communication has been saved in a collection of tentatively actionable social media communications;
  save the root social media communication to the collection of tentatively actionable social media communications when the ID is not included therein; and
  when the ID has been previously saved, drop the root social media communication.

6. The non-transitory computer-readable medium of claim 2, wherein the determining of whether the current social media communication is actionable comprises:
  checking whether one or more hashtags are included in the current social media communication;
  when no hashtags are included, adding the current social media communication to the collection of actionable social media communications; and
  when one or more hashtags are included in the current social media communication, checking whether the one or more hashtags have been stored.

7. The non-transitory computer-readable medium of claim 6, wherein
  for each hashtag that has not been stored, the program is further configured to cause the at least one processor to store the hashtag and set a count for the hashtag to 1, and
  for each hashtag that has been stored, the program is further configured to cause the at least one processor to increment the count for the hashtag.

8. The non-transitory computer-readable medium of claim 7, wherein when the count for at least one of the one or more hashtags is at least a predetermined number, the program is further configured to cause the at least one processor to drop the current social media communication.

9. The non-transitory computer-readable medium of claim 6, wherein a different predetermined number is used for at least two hashtags.

10. The non-transitory computer-readable medium of claim 1, wherein for each fetched social media communication that tags or mentions the one or more social media assets, the program is further configured to cause the at least one processor to:
  check whether the social media communication has any activity indicative of the social media communication not being noise,
  when the activity is not indicative of noise, drop the social media communication; and
  otherwise:
    check whether a brand associated with the one or more social media assets has responded to the social media communication, and
    when the brand has responded, drop the social media communication.

11. The non-transitory computer-readable medium of claim 10, wherein for all users whose social media communications have not been dropped after the steps of claim 10, the program further configured to cause the at least one processor to:
  fetch all users for the social media communications that have not been dropped;
  for each user:
    check whether the brand has responded to the user during a predetermined previous time period; and
    when the brand has not previously responded to the user, drop all social media communications from the user.

12. The non-transitory computer-readable medium of claim 11, wherein for all users to which the brand has previously responded, the program is further configured to cause the at least one processor to:
  run a one-class classifier (OCC) built from the collection of actionable social media communications on noise social media communications;
  for each social media communication in a noise collection, check whether the social media communication is predicted as an outlier by the OCC;
  when the social media communication is not predicted as an outlier by the OCC, drop the social media communication; and
  for each social media communication that is predicted as an outlier by the OCC, add the social media communication to the collection of noise social media communications.

13. A computer-implemented method, comprising:
  fetching, by a computing system, outgoing social media communications for one or more social media assets, wherein a social media asset for a brand or an individual is an account associated with one or more social media communication systems;
  for each fetched social media communication for the one or more social media assets:
    when a current social media communication is a reply to any inbound message:
      traversing up a tree for a current social media communication thread to a root social media communication of the tree, by the computing system, the traversing up the tree for the current social media communication comprising, when the current social media communication is a reply to another social media communication, fetching a social media communication that the current reply points to and repeating this process until the root social media communication is fetched, determining, by the computing system, whether or not the current social media communication is actionable, when the current social media communication is actionable, adding the social media communication to a collection of actionable social media communications, by the computing system, and when the current social media communication is not actionable, dropping the social media communication, by the computing system; and when the current social media communication is not a reply to any inbound message, dropping the current social media communication, by the computing system, wherein actionable social media communications are communications indicative that an individual intends to engage with an entity, brand, or individual.

14. The computer-implemented method of claim 13, wherein the determining of whether the current social media communication is actionable comprises:

checking whether one or more hashtags are included in the current social media communication, by the computing system;

when no hashtags are included, adding the current social media communication to the collection of actionable social media communications, by the computing system; and when one or more hashtags are included in the current social media communication, checking whether the one or more hashtags have been stored, by the computing system.

15. The computer-implemented method of claim 14, wherein for each hashtag that has not been stored, the method further comprises storing the hashtag and setting a count for the hashtag to 1, by the computing system, and for each hashtag that has been stored, the method further comprises incrementing the count for the hashtag, by the computing system.

16. The computer-implemented method of claim 15, wherein when the count for at least one of the one or more hashtags is at least a predetermined number, the method further comprises dropping the current social media communication, by the computing system.

17. A computer-implemented method, comprising:

fetching, by a computing system, social media communications that tag or mention one or more social media assets, wherein a social media asset for a brand or an individual is an account associated with one or more social media communication systems;

for each fetched social media communication that tags or mentions the one or more social media assets:

when a current social media communication is a reply to any inbound message, traversing up a tree for a current social media communication thread to a root social media communication of the tree, the traversing up the tree for the current social media communication comprising, when the current social media communication is a reply to another social media communication, fetching a social media communication that the current reply points to and repeating this process until the root social media communication is fetched, checking whether the social media communication has any soft-engagement activity from a brand associated with the one or more social media assets, by the computing system, and when the status is not indicative of noise, dropping the social media communication, by the computing system; and otherwise:

checking whether the brand associated with the one or more social media assets has responded to the social media communication, by the computing system, and when the brand has not responded, dropping the social media communication, by the computing system.

18. The computer-implemented method of claim 17, wherein for all users whose social media communications have not been dropped after the steps of claim 17, the method further comprises:

fetching, by the computing system, all users for the social media communications have not been dropped;

for each user:

checking whether the brand has responded to the user during a predetermined previous time period, by the computing system, and when the brand has not previously responded to the user, dropping all social media communications from the user, by the computing system.

19. The computer-implemented method of claim 18, wherein for all users to which the brand has previously responded, the method further comprises:

running a one-class classifier (OCC) built from a collection of actionable social media communications on noise social media communications, by the computing system;

for each social media communication in a noise collection, checking whether the social media communication is predicted as an outlier by the OCC, by the computing system;

when the social media communication is not predicted as an outlier by the OCC, dropping the social media communication, by the computing system; and for each social media communication that is predicted as an outlier by the OCC, adding the social media communication to a collection of noise social media communications, by the computing system, wherein actionable social media communications are communications indicative that an individual intends to engage with an entity, brand, or individual, and noise social media communications are communications indicative that an individual has no intent of engaging with the entity, brand, or individual.

* * * * *